(12) United States Patent
Wynalda, Jr. et al.

(10) Patent No.: US 7,989,041 B2
(45) Date of Patent: Aug. 2, 2011

(54) STORAGE CONTAINER FOR RECORDED MEDIA

(76) Inventors: Robert Martin Wynalda, Jr., Comstock Park, MI (US); Ronald M. Marsilio, Canton, OH (US)

(*) Notice: Subject to any disclaimer, the term of this patent is extended or adjusted under 35 U.S.C. 154(b) by 0 days.

(21) Appl. No.: 09/883,619

(22) Filed: Jun. 18, 2001

(65) Prior Publication Data
US 2002/0094394 A1 Jul. 18, 2002

Related U.S. Application Data (63) Continuation-in-part of application No. 09/794,831, filed on Feb. 28, 2001, now abandoned.

(60) Provisional application No. 60/261,177, filed on Jan. 12, 2001.

(51) Int. Cl.
*B32B 1/02* (2006.01)

(52) U.S. Cl. .................................................. 428/34.1

(58) Field of Classification Search ............... 428/34.1; 206/308.1, 387.1, 472, 473, 303, 232, 387.13, 206/493, 308.2, 309–313; 281/21.1, 23, 281/26
See application file for complete search history.

(56) References Cited

U.S. PATENT DOCUMENTS

| | | | |
|---|---|---|---|
| 1,186,312 A * | 6/1916 | Hanselmann | 206/311 |
| 2,287,365 A * | 6/1942 | Widder et al. | 206/311 |
| 3,244,436 A * | 4/1966 | McKowen | 281/23 |
| 4,199,061 A * | 4/1980 | Harkleroad et al. | 206/232 |
| 4,327,831 A | 5/1982 | Inaba et al. | 206/310 |
| 4,778,047 A | 10/1988 | Lay | 206/44 B |
| 4,793,480 A * | 12/1988 | Gelardi et al. | 206/308.1 |
| 4,823,950 A | 4/1989 | Roze | 206/311 |
| 4,844,260 A | 7/1989 | Jaw | 206/444 |
| 4,850,731 A | 7/1989 | Youngs | 402/79 |
| 5,176,250 A | 1/1993 | Cheng | 206/45.13 |
| 5,188,228 A | 2/1993 | Barrett | 206/310 |
| 5,188,229 A | 2/1993 | Bernstein | 206/312 |
| 5,188,230 A | 2/1993 | O'Brien et al. | 206/312 |
| 5,207,717 A | 5/1993 | Manning | 206/232 |
| 5,246,107 A | 9/1993 | Long et al. | 206/309 |
| 5,284,242 A | 2/1994 | Roth et al. | 206/310 |
| 5,284,918 A | 2/1994 | Huynh-Tran et al. | 525/124 |
| 5,291,990 A | 3/1994 | Sejzer | 206/309 |
| 5,295,577 A | 3/1994 | Minter | 206/309 |
| 5,307,927 A | 5/1994 | Curtis et al. | 206/312 |
| 5,322,162 A | 6/1994 | Melk | 206/310 |
| 5,392,906 A | 2/1995 | Taniyama | 206/311 |
| 5,402,882 A | 4/1995 | Bandy et al. | 206/310 |
| 5,407,067 A | 4/1995 | Cotter et al. | 206/312 |
| 5,422,875 A | 6/1995 | Bribach | 369/291 |
| 5,450,953 A | 9/1995 | Reisman | 206/310 |
| 5,460,265 A | 10/1995 | Kiolbasa | 206/308.1 |

(Continued)

FOREIGN PATENT DOCUMENTS
DE 93 18 050 U 1/1994
(Continued)

*Primary Examiner* — Alicia Chevalier
(74) *Attorney, Agent, or Firm* — Zollinger & Burleson Ltd (57) ABSTRACT

A storage container for recorded media includes a substantially rigid disc-holding page connected to a cover member along the spine of the cover member so that the container may be open and closed like a book. The connection between the cover member and the page includes an adhesive connection along the spine of the cover member. The adhesive connection is only disposed along one edge of the rigid page.

21 Claims, 9 Drawing Sheets

U.S. PATENT DOCUMENTS

| | | | |
|---|---|---|---|
| 5,506,740 A | 4/1996 | Harmon | 360/133 |
| 5,513,749 A | 5/1996 | Simmons | 206/308.1 |
| 5,570,781 A | 11/1996 | Bond et al. | 206/308.1 |
| 5,590,912 A | 1/1997 | Stevens | 283/56 |
| 5,611,426 A | 3/1997 | Warfield | 206/308.1 |
| 5,651,458 A | 7/1997 | Brosmith et al. | 206/308.1 |
| 5,657,867 A | 8/1997 | Fu et al. | 206/308.1 |
| 5,695,054 A | 12/1997 | Weisburn et al. | 206/308.1 |
| 5,697,498 A * | 12/1997 | Weisburn et al. | 206/308.1 |
| 5,713,462 A | 2/1998 | Hansen | 206/308 |
| 5,720,384 A | 2/1998 | Wu-Chen | 206/308.1 |
| 5,727,681 A | 3/1998 | Li | 206/308.1 |
| 5,730,283 A | 3/1998 | Lax | 206/308.1 |
| 5,772,019 A | 6/1998 | Reed | 206/308.1 |
| 5,775,490 A | 7/1998 | Baker et al. | 206/308.1 |
| 5,775,491 A | 7/1998 | Taniyama | 206/308.1 |
| 5,791,468 A | 8/1998 | House | 206/308.1 |
| 5,799,782 A | 9/1998 | Gelardi | 206/308.1 |
| 5,806,672 A | 9/1998 | Bosworth | 206/310 |
| 5,833,063 A | 11/1998 | Ho | 206/308.1 |
| 5,865,310 A | 2/1999 | Lee | 206/308.1 |
| 5,884,761 A | 3/1999 | Gelardi et al. | 206/308.1 |
| 5,887,713 A | 3/1999 | Smith et al. | 206/308.1 |
| 5,904,245 A | 5/1999 | Tsujino | 206/308.1 |
| 5,906,275 A | 5/1999 | Jokic | 206/308.1 |
| 5,915,549 A | 6/1999 | Palmer et al. | 206/308.1 |
| 5,915,550 A * | 6/1999 | Gartz | 206/308.1 |
| 5,996,785 A | 12/1999 | Palmer et al. | 206/308.1 |
| 6,050,404 A | 4/2000 | Lee | 206/308.1 |
| 6,068,117 A | 5/2000 | Koehn | 206/232 |
| 6,073,763 A | 6/2000 | Collins | 206/308.1 |
| 6,106,015 A | 8/2000 | Udwin et al. | 281/29 |
| 6,250,462 B1 | 6/2001 | Kato | 206/312 |
| 6,409,013 B1 * | 6/2002 | Eskandry | 206/308.1 |
| 2003/0106814 A1 | 6/2003 | Gelardi | |

FOREIGN PATENT DOCUMENTS

| | | | |
|---|---|---|---|
| GB | 2154550 A * | 9/1985 | |
| GB | 2 274 450 A | 7/1994 | |
| GB | 2 274 452 A | 7/1994 | |

* cited by examiner

STORAGE CONTAINER FOR RECORDED MEDIA

CROSS-REFERENCE TO RELATED APPLICATIONS

This application claims priority from U.S. Provisional Application serial No. 60/261,177 filed Jan. 12, 2001, and is a continuation-in-part application of U.S. patent application Ser. No. 09/794,831 filed Feb. 28, 2001 now abandoned, titled An Expandable Spine Recordable Optical Disk Package; the disclosures of both applications are incorporated herein by reference.

BACKGROUND OF THE INVENTION

1. Technical Field

The present invention generally relates to storage containers for recorded media and, more particularly, to storage containers that hold disc-shaped items of recorded media. Specifically, the present invention relates to a storage container for recorded media having substantially rigid disc-holding pages that are connected to a paperboard cover along the spine of the cover so that the container functions like a book. The configuration of the container may be easily expanded for multiple discs and provides multiple locations for printed graphics.

2. Background Information

Various companies are now selling media products recorded on multiple storage discs such as CDs and DVDs. One example of a multiple disc media product is a musical "box set" from a particular artist that may be recorded on two, three, four, or more CDs. Another example is an unabridged audio book that may be recorded on six or more compact discs. A further example is a group of related movies recorded on multiple DVDs. Each of these examples must be shipped, sold to consumers, and stored in a media storage container.

The manufacturers desire an inexpensive storage container that can hold multiple media storage discs in a relatively compact space. The manufactures desire that the width and height dimensions of the container be substantially equal to the width and height dimensions of a single disc storage container such as the width and height of the industry standard CD jewel box and the width and height dimension of the popular DVD storage container. Manufacturers also desire a container that may be easily configured to hold even or odd numbers of discs while providing ample room for printing information about the discs directly on the storage container.

A wide variety of media storage containers exist in the art and each presumably functions well for its intended purpose. Despite of the variety of containers known in the art, the industry still desires new containers that are correctly sized, easy and inexpensive to manufacture, provide ample room for graphic information, and are easy to use by the customer.

BRIEF SUMMARY OF THE INVENTION

The present invention provides a storage container for recorded media that includes a substantially rigid disc-holding page connected to a cover member along the spine of the cover member so that the container may be open and closed like a book.

The invention also provides a storage container for an item of recorded media wherein the item of recorded media is held in a rigid page that protects the item of recorded media. The rigid page is connected to a paperboard cover member that opens and closes like a book. The connection between the paperboard cover member and the rigid page includes an adhesive connection along the spine of the cover member. The adhesive connection is only disposed along one edge of the rigid page.

The invention further provides a storage container having multiple surfaces where graphic information may be presented to the user of the storage container. The cover provides five surfaces for graphic information and each rigid page can be configured to provide two surfaces for presenting graphic information.

BRIEF DESCRIPTION OF THE SEVERAL VIEWS OF THE DRAWINGS

Similar numbers refer to similar parts throughout the specification.

DETAILED DESCRIPTION OF THE INVENTION

Figures 1, 2:
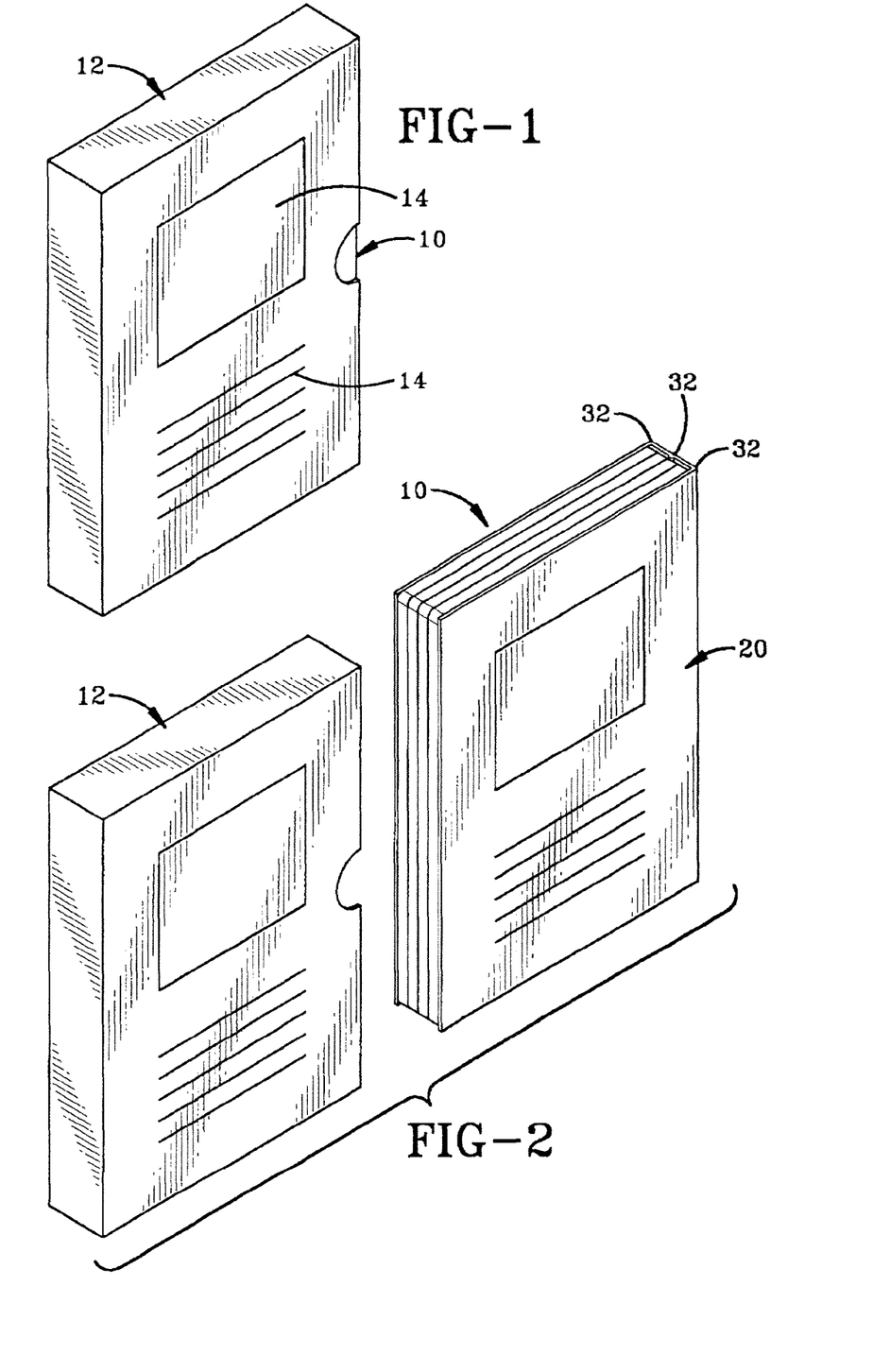
FIG. 1 is a perspective view of the media storage container of the present invention in a closed configuration inside of a storage sleeve.
FIG. 2 is an exploded view of FIG. 1.

The media storage container of the present invention is indicated generally by the numeral 10 in the accompanying drawings. Media storage container 10 may be received in a protective sleeve 12 as depicted in FIGS. 1 and 2. Sleeve 12 may be used by the owner of container 10 to prevent container 10 from opening while it is stored and to protect container 10 from dust during storage. Sleeve 12 provides five surfaces for the manufacturer or seller of container 10 to print graphical information 14 used to identify the contents of container 10, advertise the identity of seller, or advertise the contents of storage container 10.

Figures 7, 8:
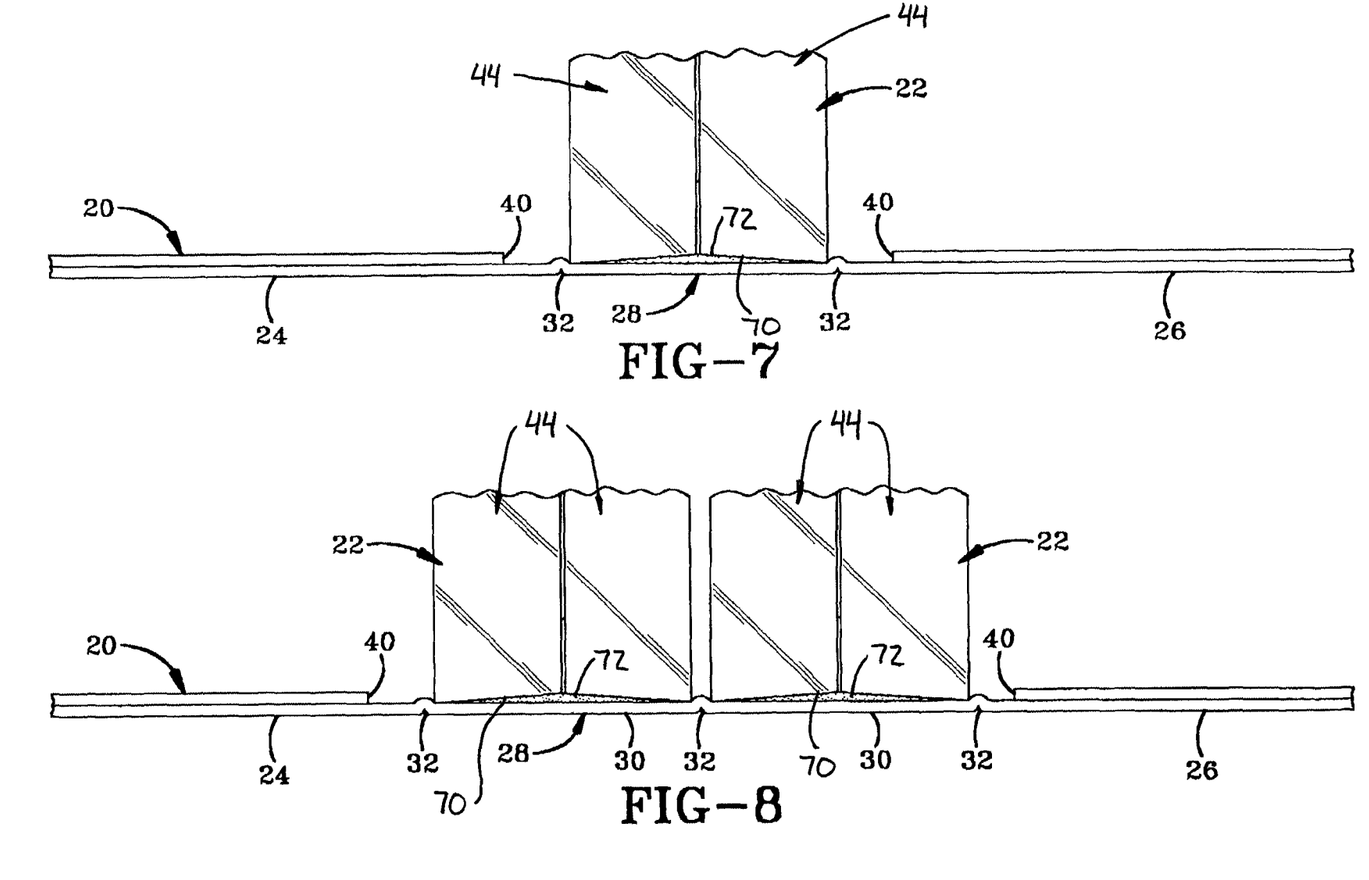
FIG. 7 is an end view of the spine portion of the storage container taken substantially along line 7-7 of FIG. 4.
FIG. 8 is a view similar to FIG. 7 showing the media storage container configured to hold four discs.
Figure 9:
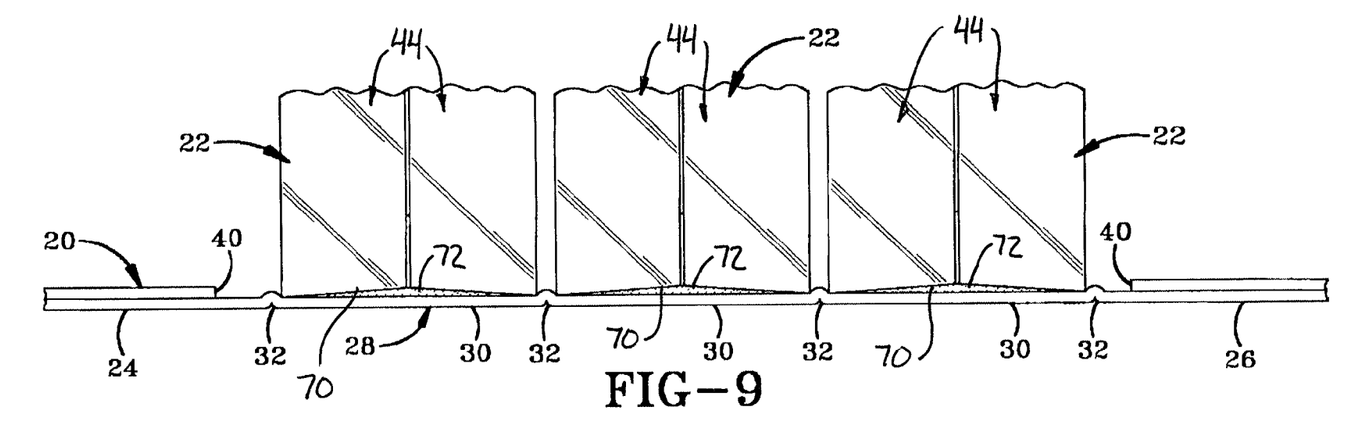
FIG. 9 is a view similar to FIG. 7 showing the media storage container configured to hold six discs.
Figure 10:
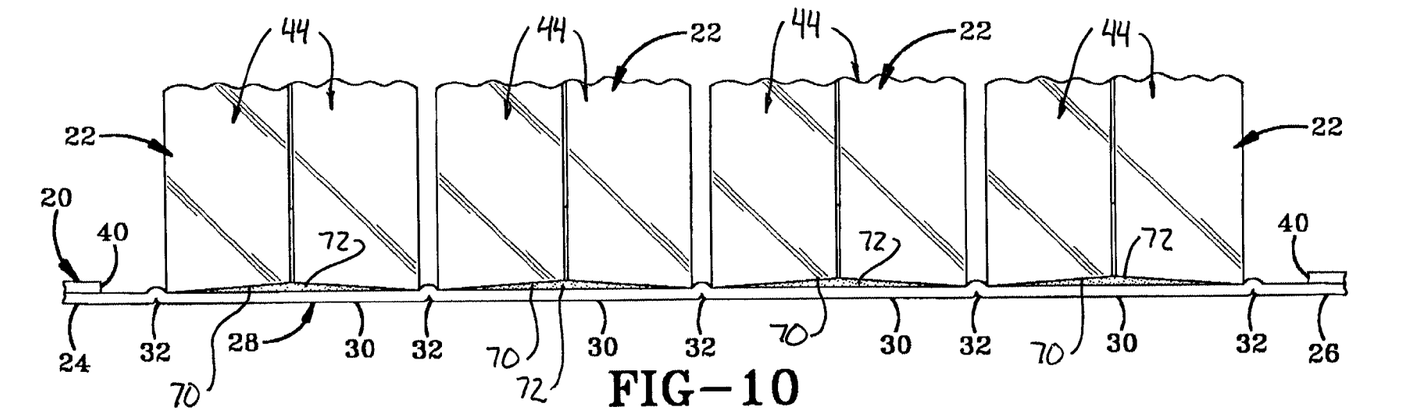
FIG. 10 is a view similar to FIG. 7 showing the media storage container configured to hold eight discs.

Storage container 10 generally includes a cover 20 and at least one page 22 that are connected together in a book-like fashion. Cover 20 includes a front cover 24, a rear cover 26 and a spine 28. Spine 28 is disposed between covers 24 and 26. Spine 28 has a width slightly greater than the thickness of page 22 such that covers 24 and 26 may be moved from an open position (depicted in FIG. 3) to a closed position (depicted in FIG. 2) where covers 24 and 26 are disposed flat against the front and rear surfaces of page 22. The width of spine 28 thus changes as more pages 22 are added to container 10 as depicted in FIGS. 4 and 7-10. When multiple pages are added to container 10, spine 28 will include an individual spine portion 30 for each page 22. In FIG. 8, spine 28 includes two pages 22 and two spine portions 30. In FIG. 9, storage container 10 includes three pages 22 and spine 28 includes three spine portions 30. In FIG. 10, storage container 10 includes four pages 22 and spine 28 includes four spine portions 30.

Figure 3:
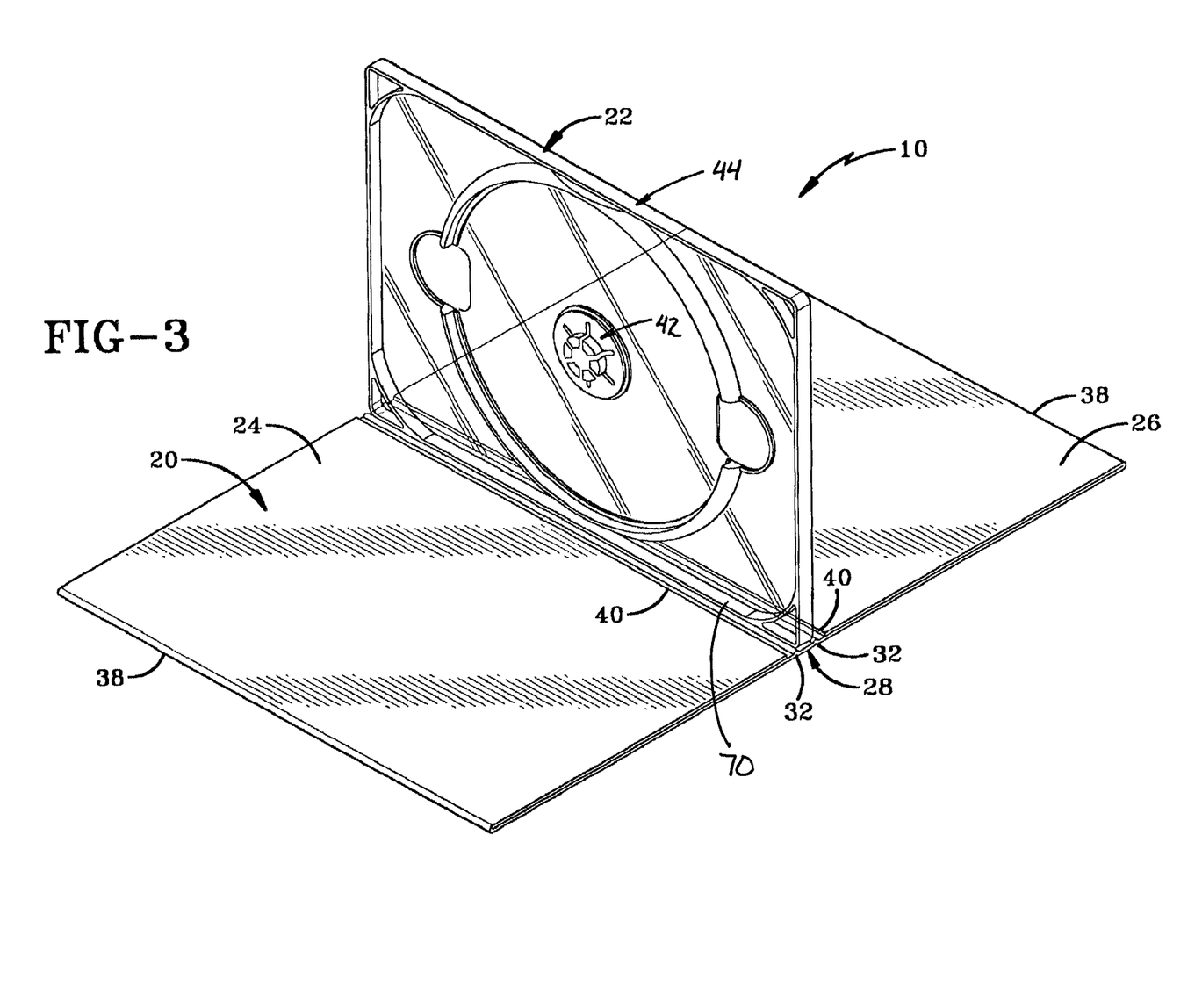
FIG. 3 is a perspective view of the media storage container of the present invention in an open configuration wherein the media storage container is configured to hold a single disc.
Figure 4:
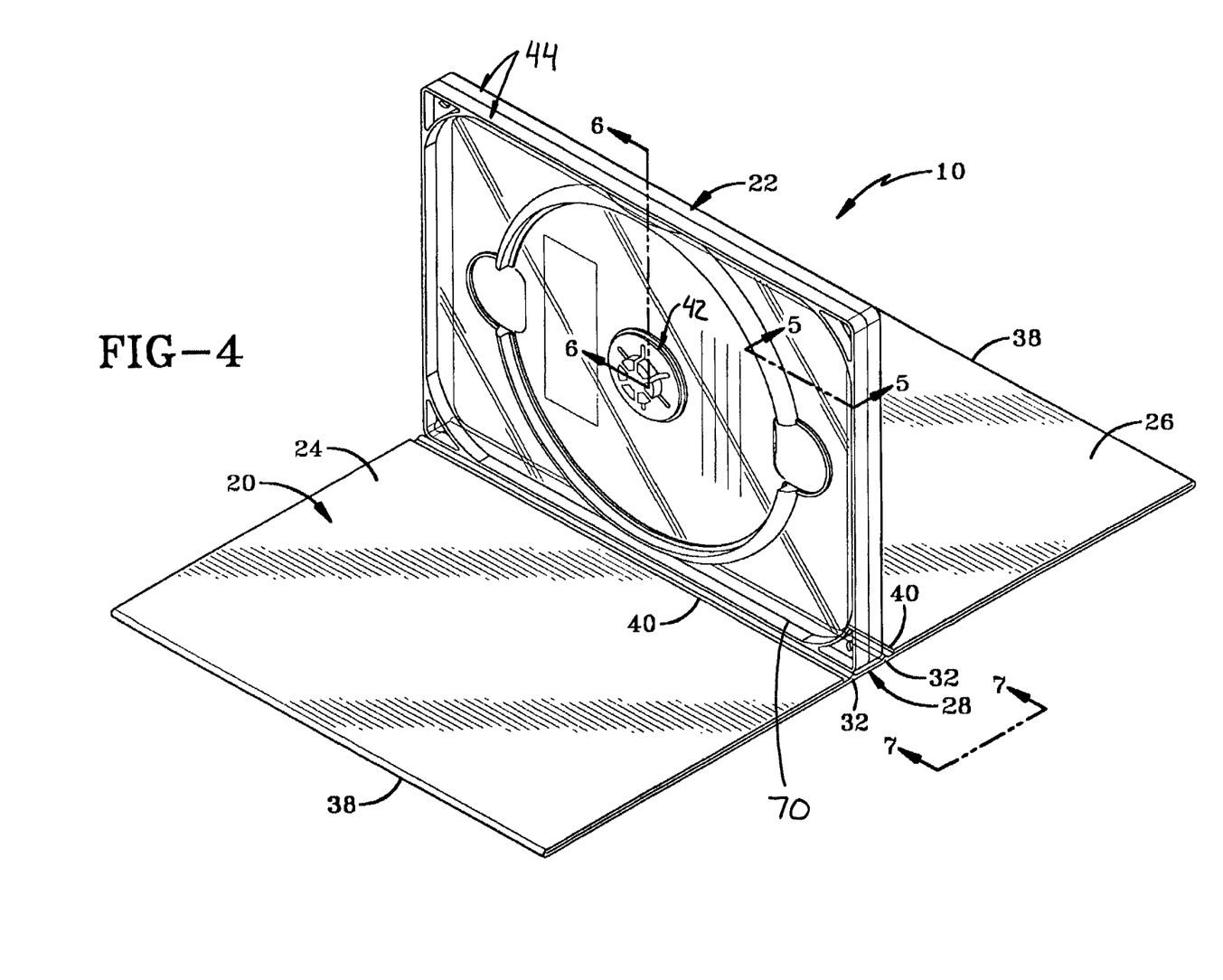
FIG. 4 is a perspective view similar to FIG. 3 wherein the media storage container of the present invention is configured to hold two discs.

Spine 28 is defined by a pair of hinges 32 (FIG. 7) that allow covers 24 and 26 to pivot with respect to spine 28 from the open position depicted in FIG. 7 to the closed position depicted in FIG. 2. Hinges 32 may be living hinges formed from the material of cover 20. Each hinge 32 may be defined by an outwardly-facing indentation and an inwardly-facing protuberance. Another manner of forming hinge 32 is to provide cover 20 with areas of reduced thickness at the locations of hinges 32. Each hinge 32 may extend the entire height of cover 20 as depicted in FIGS. 3 and 4. In other embodiments, hinges 32 are not continuous along the height of cover 20.

Cover 20 may be fabricated from a variety of different materials known to those skilled in the art. For instance, cover 20 may be fabricated from a thin plastic material, a thin metal material, a cloth material, or a fiber material. In one embodiment of the invention, cover 20 is fabricated from a paperboard material. In some embodiments of the invention, it may be desirable to form each cover 24 and 26 with two layers of the material by folding the material along its outer edges 38 and laying the material back over itself with the end 40 of the material being adjacent hinge 32. Forming covers 24 and 26 with a double layer of material adds rigidity to container 10 and will help cover 20 wear during extended use. A suitable adhesive may be used to hold the two layers of the material together at covers 24 and 26. In other embodiments of the invention, suitable connectors such as rivets, staples, screws, nails, studs, and other connectors known to those skilled in the art may be used to hold the two layers of material together. In still other embodiments of the invention, interlocking tabs may be used to hold the two layers together.

When the material of cover 20 permits scoring, hinges 32 may be formed by scoring the material of covers 20 at the locations of hinges 32. The scoring may be achieved by running a dull knife along the location of hinge with sufficient pressure to indent the material without puncturing the material. The scoring may also be achieved by pressing a scoring die into the material at the location of hinges 32. Paperboard is particularly suitable for scoring and hinges 32 created by scoring a paperboard cover have been successful.

Each page 22 may be configured to hold one or two disc-shaped items of recorded media. Container 10 thus may be configured to hold both even and odd numbers of discs by combining different numbers of odd and even pages 22. When page 22 is configured to hold a single disc, a single hub 42 is disposed on one side of page 22. When page 22 is configured to hold two discs, two hubs 42 are disposed on opposite sides of page 22. In this configuration, page 22 is formed from two page halves 44 that are connected together in a back-to-back arrangement so that the two discs are accessible from opposite sides of page 22.

Halves 44 may be connected together in any of a wide variety of different manners. Halves 44 may be formed with locking fingers 46 that snap fit onto ledges 48 defined at the edge of openings 50. Each locking finger 46 has an angled upper surface that engages the other half 44 to bend the finger outwardly to allow finger 46 to deflect through opening 50. Each halve 44 may be formed with two fingers 46 disposed at opposite corners so that a locking finger 46 snaps onto a ledge 48 at all four corners of page 22 when the halves 44 are snapped together. Fingers 46 may be disposed in pockets 52 defined by pocket walls 54 to protect the connection between fingers 46 and ledges 48.

Figure 5:
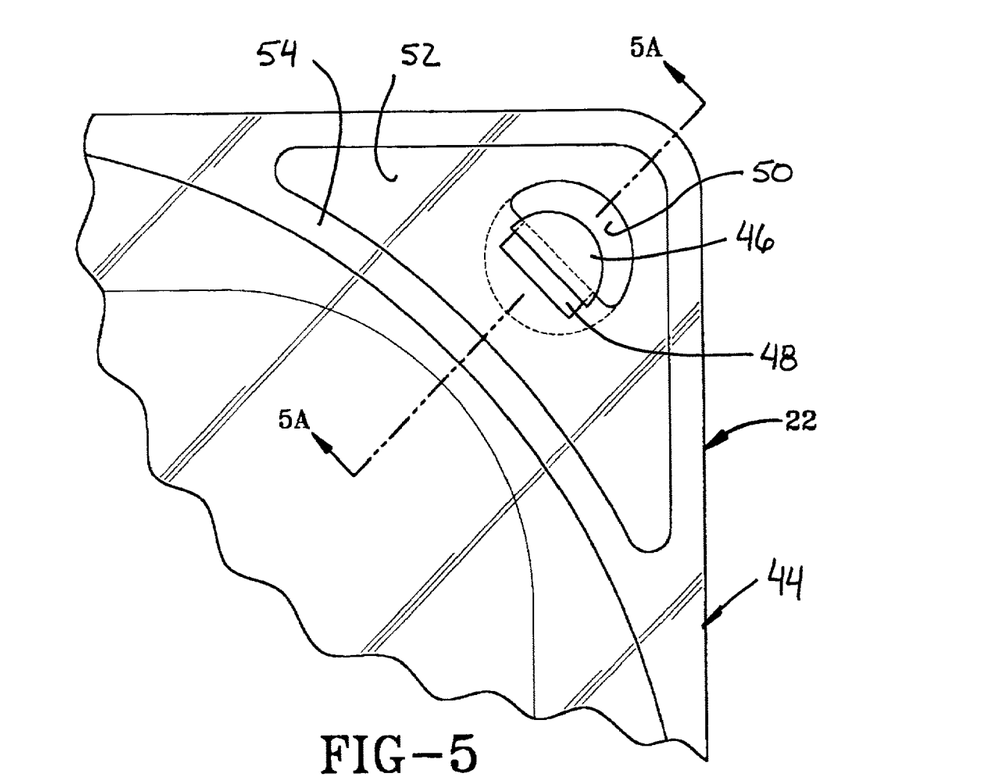
FIG. 5 is an enlarged elevation view taken substantially along line 5-5 of FIG. 4.
Figure 5A:
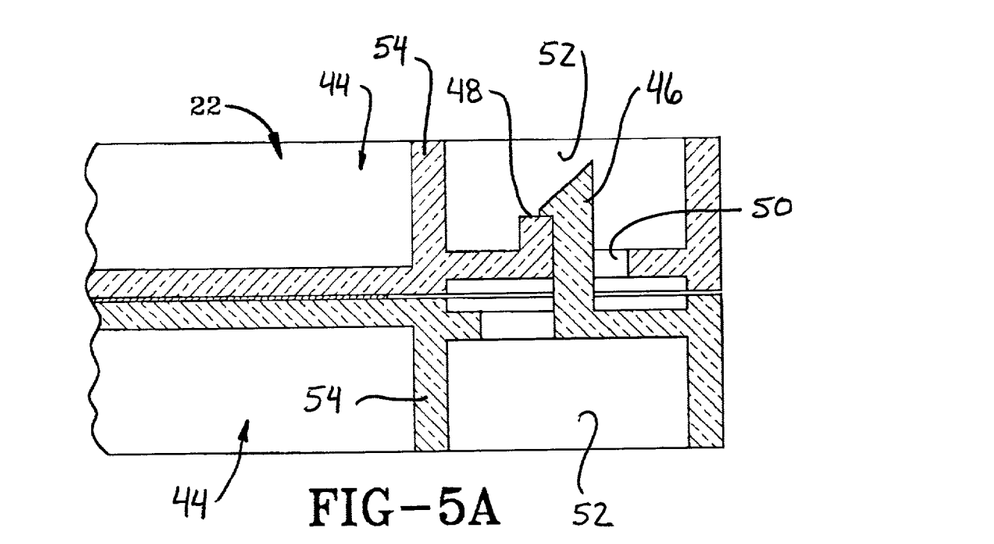
FIG. 5A is a section view taken along 5A-5A of FIG. 5.
Figure 5B:
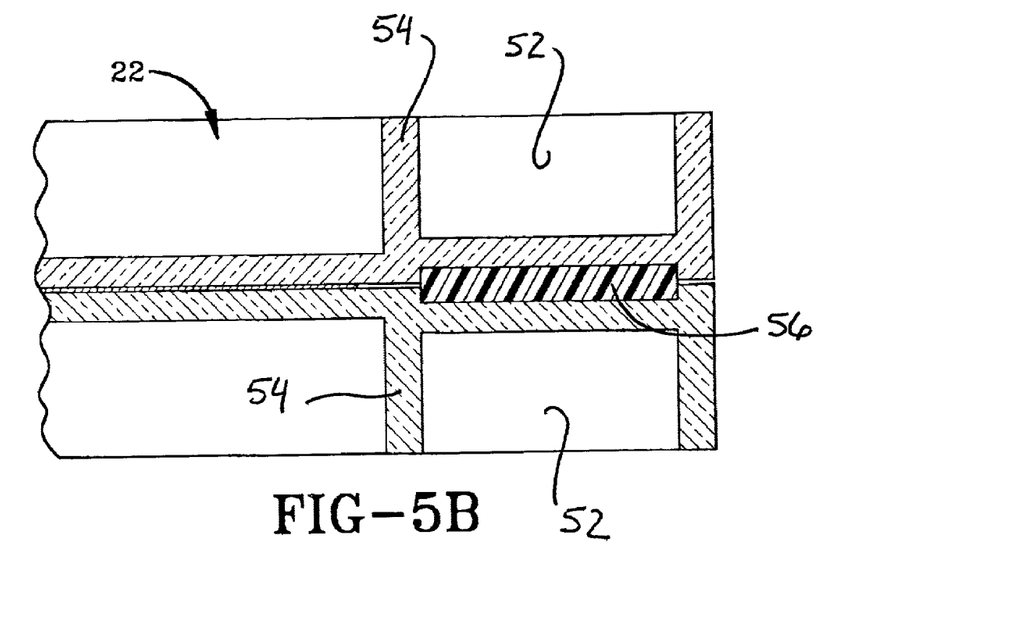
FIG. 5B is a view similar to FIG. 5A showing an alternate connector.
Figure 5C:
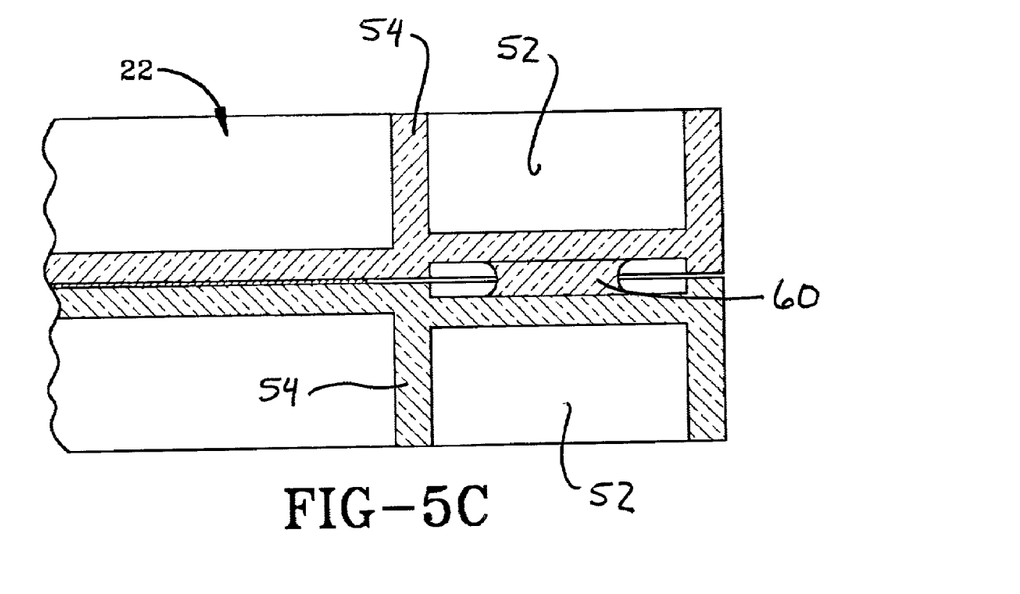
FIG. 5C is a view similar to FIG. 5A showing an alternate connector.
Figure 6:
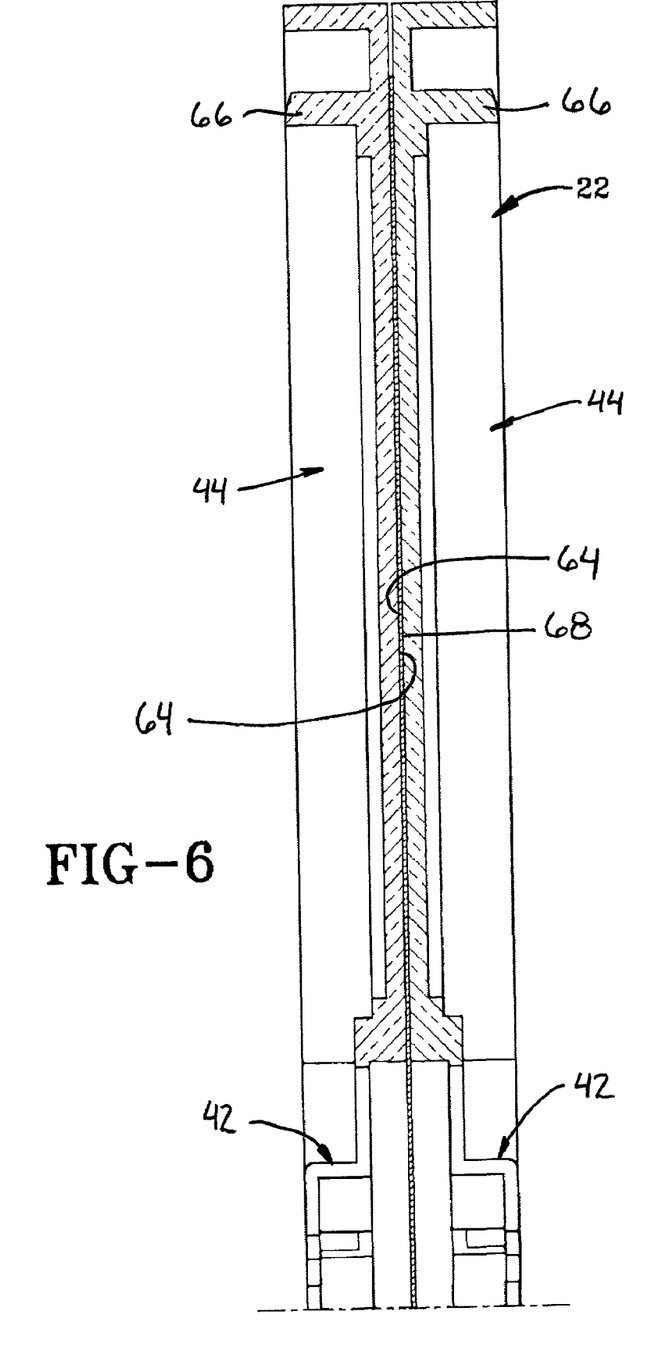
FIG. 6 is a section view taken along line 6-6 of FIG. 4.

Other ways of connecting halves 44 are depicted in FIGS. 5B and 5C. In FIG. 5B, an adhesive 56 is used to connected halves 44. In FIG. 5C, halves 44 are welded together with a weld 60. Other manners of connecting halves 44 may be used without departing from the concepts of the present invention.

Each half 44 includes a perimeter sidewall having thickness sufficient to protect the item of recorded media held on page half 44. The perimeter sidewalls of halves 44 cooperate together to form a perimeter sidewall for page 22. The sidewalls of pages 22 abut one another to provide rigidity to container 10 when all pages 22 and cover 20 are closed.

Each page half 44 defines a rear surface having planar portions 64 that abut each other when halves 44 are connected together. Planar portions 64 define a majority of the surface area of each page half 44 and are disposed everywhere except hub 42 and pockets 52. The outer wall 66 surrounding hub 42 may have a planar rear surface. Planar portions 64 allow a literature card 68 to be pressed between halves 44 when halves 44 are connected. The printing on literature card 68 may be easily viewed by the user of container 10 because the material of halves 44 is disposed immediately adjacent card 68 and does not distort the printing on card 68. When card 68 is used, halves 44 must be fabricated from a substantially transparent material so that the printing on card 68 may be viewed. In other embodiments of the invention, halves 44 may be fabricated from an opaque material.

Container 10 may thus be configured to have up to seven graphic areas for presenting information to the consumer. Cover 20 defines five covers with page 22 defining two areas.

Each page 22 is connected to cover 20 along one edge 70 of page 22 so that cover 20 will act like the cover of a book. When page 22 is symmetric, page 22 will have two edges 70 that will allow for connection to spine 28. In one embodiment of the invention, edge 70 is connected to spine 28 with an adhesive 72. Edge 70 may be somewhat V-shaped in cross section (see FIG. 7) to provide a pocket to hold adhesive 72. The walls of the pocket may have a slight draft such as 2 percent with the drawings exaggerating the draft for clarity.

Figure 11:
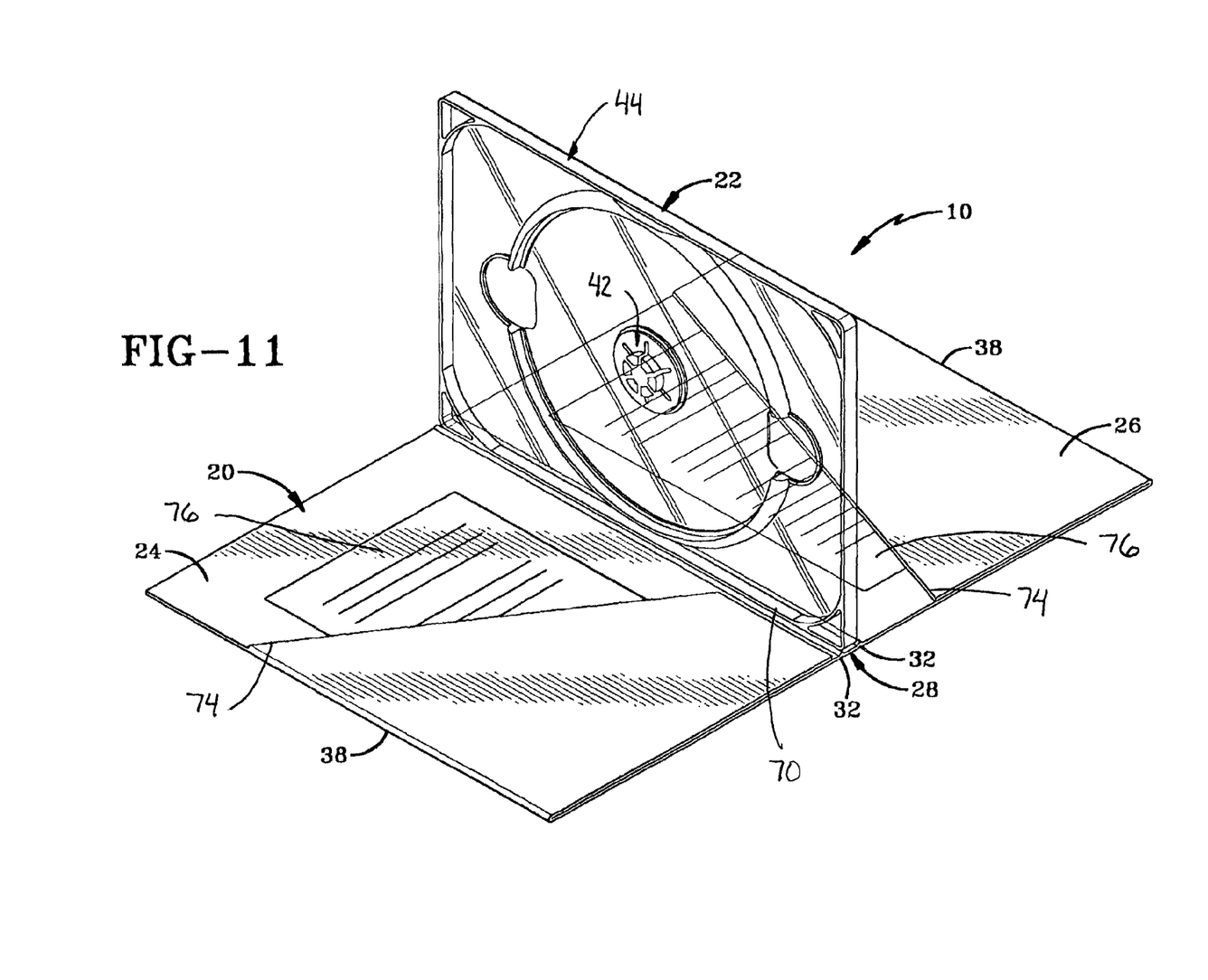
FIG. 11 is a view similar to FIG. 3 showing the cover of the media storage container configured to hold additional printed literature.

Covers 24 and 26 may include slots 74 to form pockets that will hold additional literature 76.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:
1. A CD or DVD storage container for holding multiple discs and for providing multiple locations for printed graphics; the storage container comprising:
   a cover having a front cover member, a rear cover member, and a spine disposed between the front and rear cover members;
   at least one page having a structure adapted to hold at least one item of recorded media; the page having first and second side surfaces; the structure adapted to hold at least one item of recorded media disposed on one of the first and second sides of the page;

the at least one page having at least one edge;
the edge of the page being connected to the spine with an adhesive to connect the page to the cover;
the front and rear cover members being moveable between open and closed positions;
each page being adapted to hold two items of recorded media;
each page including being formed from two page halves that are connected together in a back to back arrangement so that two discs are accessible from opposite sides of each page;
each page being substantially rigid;
the cover being fabricated from paperboard; and
the edge of the page defining a pocket that is V-shaped in cross section to provide a pocket for the adhesive; the V-shaped pocket having an apex disposed directly between the first and second sides of the page.

2. The storage container of claim 1, wherein the page halves are connected together with locking fingers.

3. The storage container of claim 2, wherein the page halves define a pocket associated with each locking finger; and each locking finger is disposed in one of the pockets to protect the locking finger.

4. The storage container of claim 1, wherein the page halves are connected together with adhesive.

5. The storage container of claim 1, wherein the page halves are connected together with a weld.

6. The storage container of claim 1, further comprising a literature card disposed between the page halves.

7. The storage container of claim 6, wherein each page half includes a rear surface; the rear surface of each page half including planar portions that abut the literature card.

8. The storage container of claim 7, wherein the rear surface of each page half has a surface area; the planar portions defining a majority of the surface area of the page half.

9. The storage container of claim 7, wherein at least one of the page halves is substantially transparent.

10. A CD or DVD storage container for holding multiple discs and for providing multiple locations for printed graphics; the storage container comprising:
a paperboard cover having a front cover member, a rear cover member, and an outer spine disposed between the front and rear cover members; the spine being a unitary body having an outer surface and an inner surface;
at least the outer surface of the outer spine being exposed for viewing when the cover is closed;
a substantially rigid page adapted to hold a pair of disc-shaped items of recorded media;
the page having at least one edge connected to the inner surface of the outer spine with an adhesive to connect the page to the cover;
the page having first and second page halves; the first and second page halves having been separately formed and joined together back-to-back to form the substantially rigid page; each of the page halves having a disc holding hub adapted to hold a disc-shaped item of recorded media; and
a literature card being pressed between the first and second halves such that the literature card is disposed between the disc-shaped items of recorded media when the disc-shaped items of recorded media are carried by the page halves.

11. The storage container of claim 10, wherein the front and rear covers pivot with respect to the outer spine independent of the rigid page.

12. The storage container of claim 10, wherein each page half includes a planar portion surrounding the disc holding hub; a substantial portion of the literature card being visible through the planar portions of the page halves.

13. A CD or DVD storage container for holding multiple discs and for providing multiple locations for printed graphics; the storage container comprising:
a paperboard cover having a front cover member, a rear cover member, and an outer spine disposed between the front and rear cover members; the spine being a unitary body having an outer surface and an inner surface, the outer surface of the outer spine being exposed for viewing when the cover is closed;
the front and rear cover members being moveable between open and closed positions;
a page having a structure adapted to hold two items of recorded media on opposite sides of the page;
the page having at least one edge and an outer perimeter;
the edge of the page being connected to the inner surface of the outer spine with an adhesive to connect the page to the cover;
the front and rear covers being pivotable with respect to the outer spine independent of the rigid page; and
the outer perimeter of the page being disposed directly between the front cover member and the rear cover member when the front and rear covers are closed on the page.

14. The storage container of claim 13, wherein the page has first and second page halves; the first and second page halves having been separately formed and joined together to form the page; each of the page halves having a disc holding hub adapted to hold a disc-shaped item of recorded media; and
a literature card being disposed between the first and second halves such that the literature card is disposed between the disc-shaped items of recorded media when the disc-shaped items of recorded media are carried by the page halves.

15. The storage container of claim 13, wherein each page half includes a planar portion surrounding the disc holding hub; a substantial portion of the literature card being visible through the planar portions of the page halves.

16. The storage container of claim 15, wherein the page halves are connected together with a weld.

17. A CD or DVD storage container for holding multiple discs and for providing multiple locations for printed graphics; the storage container comprising:
a paperboard cover having a front cover member, a rear cover member, and an outer spine disposed between the front and rear cover members; the spine being a unitary body having an outer surface and an inner surface;
at least the outer surface of the outer spine being exposed for viewing when the cover is closed;
a substantially rigid page adapted to hold a pair of disc-shaped items of recorded media;
the page having at least one edge connected to the inner surface of the outer spine with an adhesive to connect the page to the cover; and
the page having first and second page halves; the first and second page halves having been separately formed and joined together back-to-back to form the substantially rigid page; each of the page halves having a disc holding hub adapted to hold a disc-shaped item of recorded media.

18. The storage container of claim 17, wherein each page half includes a planar portion surrounding the disc holding hub.

19. The storage container of claim 17, wherein the page halves are connected together with locking fingers.

20. The storage container of claim 17, wherein the page halves are connected together with adhesive.

21. The storage container of claim 17, wherein the page halves are connected together with a weld.

* * * * *